US005483119A

United States Patent [19]
Johanson

[11] Patent Number: 5,483,119
[45] Date of Patent: Jan. 9, 1996

[54] ILLUMINATION DEVICES AND METHODS OF FORMING SAME

[76] Inventor: Walter A. Johanson, 250 E. Fifth St., #401, St. Paul, Minn. 55101

[21] Appl. No.: 77,415

[22] Filed: Jun. 15, 1993

[51] Int. Cl.⁶ .................................... H01J 1/62
[52] U.S. Cl. .................................... 313/498; 313/116
[58] Field of Search .................... 313/371, 372, 313/110, 111, 112, 116, 117, 498; 362/32, 29, 301, 302, 303, 304, 305, 307, 317, 323, 340, 347; 359/599, 615

[56] References Cited

U.S. PATENT DOCUMENTS

| | | | |
|---|---|---|---|
| 4,260,220 | 4/1981 | Whitehead | 350/76.28 |
| 4,542,449 | 9/1985 | Whitehead | 362/330 |
| 4,615,579 | 10/1986 | Whitehead | 350/96.1 |
| 4,750,798 | 6/1988 | Whitehead | 350/96.10 |
| 4,787,708 | 11/1988 | Whitehead | 350/96.28 |
| 4,791,540 | 12/1988 | Dreyer, Jr. et al. | 362/331 |
| 5,016,143 | 5/1991 | Aikens | 362/32 |
| 5,095,415 | 3/1992 | Anderson et al. | 362/340 |

FOREIGN PATENT DOCUMENTS 430548A  10/1992  Japan .................. 313/635

OTHER PUBLICATIONS

3M Scotch Optical Lighting Film Spplication Bulletin—Photometrics, Sep. 1989, pp. 1–10.

Primary Examiner—Edward L. Coles, Sr.
Assistant Examiner—Jerome Grant, II
Attorney, Agent, or Firm—Galgano & Burke

[57] ABSTRACT

Illumination devices and methods of forming illumination devices utilizing optical light films are disclosed. Joints useful in forming light tubes from optical light films are also disclosed.

16 Claims, 3 Drawing Sheets

ILLUMINATION DEVICES AND METHODS OF FORMING SAME

BACKGROUND OF THE INVENTION

The present invention relates to light conducting and light emitting tubes, herein referred to as "light tubes". More particularly, the present invention is concerned with laminated tube construction and methods of constructing light tubes to achieve a wide range of illumination effects including the piping of light from an accessible, concentrated light source to distal areas and the release of such light in widely variable patterns.

Optical light films (OLFs) can be efficiently manufactured from polymers in flat, flexible, but fragile films and made to perform a myriad of illumination functions. The film can be formed into various tubular and other partially closed configurations by supporting it together with supplemental light controlling films or elements in preformed carrier tubing having light-permeable characteristics. For example, a sheet of OLF can be formed into a closed tube by disposing one longitudinal edge of the OLF adjacent the opposite longitudinal edge. Alternatively, a sheet of OLF can also be formed into a partially closed tube, for example having an arched cross-section, and maintained in such a configuration with a supporting structure. As used herein, the term "tube" is used broadly to include both closed and partially closed configurations.

In addition to carrying light from a source of illumination, such as a high-intensity light bulb, to a remote location, light tubes can also be used for emitting light over relatively large areas. For this purpose, various methods have been devised to direct light out of a light tube over portions of the tube length. One method involves placing a clear adhesive tape on the outer, grooved side of an optical light film. A clear tape placed in this manner reduces the internal reflectance of the optical light film in the taped area and essentially creates a window for "escaping" light. Another method simply involves removing a section of the optical light film where internal reflectance is not desired. Portions of a tube lacking optical light film will permit light to escape. A third method comprises forming a light tube with some means for directing the light at the walls of the optical light film at an angle greater than about 28°. At such angles of incidence, the internal reflectance of the optical light film is greatly reduced. For example, the 3M Company of St. Paul, Minn., produces a product marketed under the name "X-70" which directs incident light at an angle of about 90° to the angle of incidence. If a piece of "X-70" is positioned within a light tube, light moving generally along the longitudinal axis of the tube will be directed through the "X-70" substantially perpendicular toward a sidewall and out of the light tube. Another product, marketed under the name "SCOTCH-CAL EXTRACTOR FILM™", directs light toward and through an opposite interior wall.

Since optical light film is fragile and sensitive to dirt and moisture, it is typically positioned within protective, outer tubes. Such tubes are generally transparent and can have a variety of finishes, e.g. clear, matte, colored or opaque. The ability to insert the fragile optical light films into a carrier tubing, typically an extrusion product, is an impediment to the light tube designer. Moreover, shipping fabricated light tubes is costly because of their high volume relative to volume of component displacement and their inherent vulnerability to damage by breaking and scratching. Thus the low manufacturing cost of the critical optical film component is heavily offset by shipping costs. Also lost is the ability of the designer to achieve at acceptable cost finished products which feature many of the useful and underlying lighting functions which the optical light film is inherently capable of performing.

It would therefore be desirable to provide novel methods for forming light tubes and light tube products using the films which are cost effective, optically efficient and functionally varied.

SUMMARY OF THE INVENTION

The present invention comprises improvements in methods of forming light carriers and the resulting light carriers comprising optical light film.

One embodiment of the present invention comprises a first sheet of optical light film connected to an outer, protective sheet of a second material in an area remote from the edges of the two sheets. The opposing longitudinal edges of both sheets are configured such that the second edge of the optical light film is positioned between the first edge of optical light film and the first edge of the outer protective sheet while the second edge of the outer protective sheet is connected with a first edge region of the protective sheet. This light tube provides a sheet of optical light film substantially surrounded by an outer, protective sheet which facilitates maintaining the optical light film in a clean, dry and optically efficient condition.

Another aspect of the present invention comprises connecting two sheets in a manner similar to that described above and disposing at least one sheet of optical light film between the two sheets. These and other embodiments of the present invention are described in further detail below.

DETAILED DESCRIPTION

One embodiment of the present invention is directed to a light carrier comprising at least one sheet of optical light film 10 which is maintained in a tube configuration by a novel joint. The optical light film preferably has enough flexibility and sufficient width so that one longitudinal edge 11 can be moved to a position proximate the other longitudinal edge 12 thereby forming a tube, preferably having a generally cylindrical shape. Unless otherwise specified, the term "optical light film" is used herein to refer to flexible films having a surface comprising a plurality of substantially triangular grooves which reflect substantially all of the light incident on the opposite side of the film at an angle of less than about 28° when formed into a light tube. Such film is available from the 3M Corporation, St. Paul, Minn.

Figure 1:
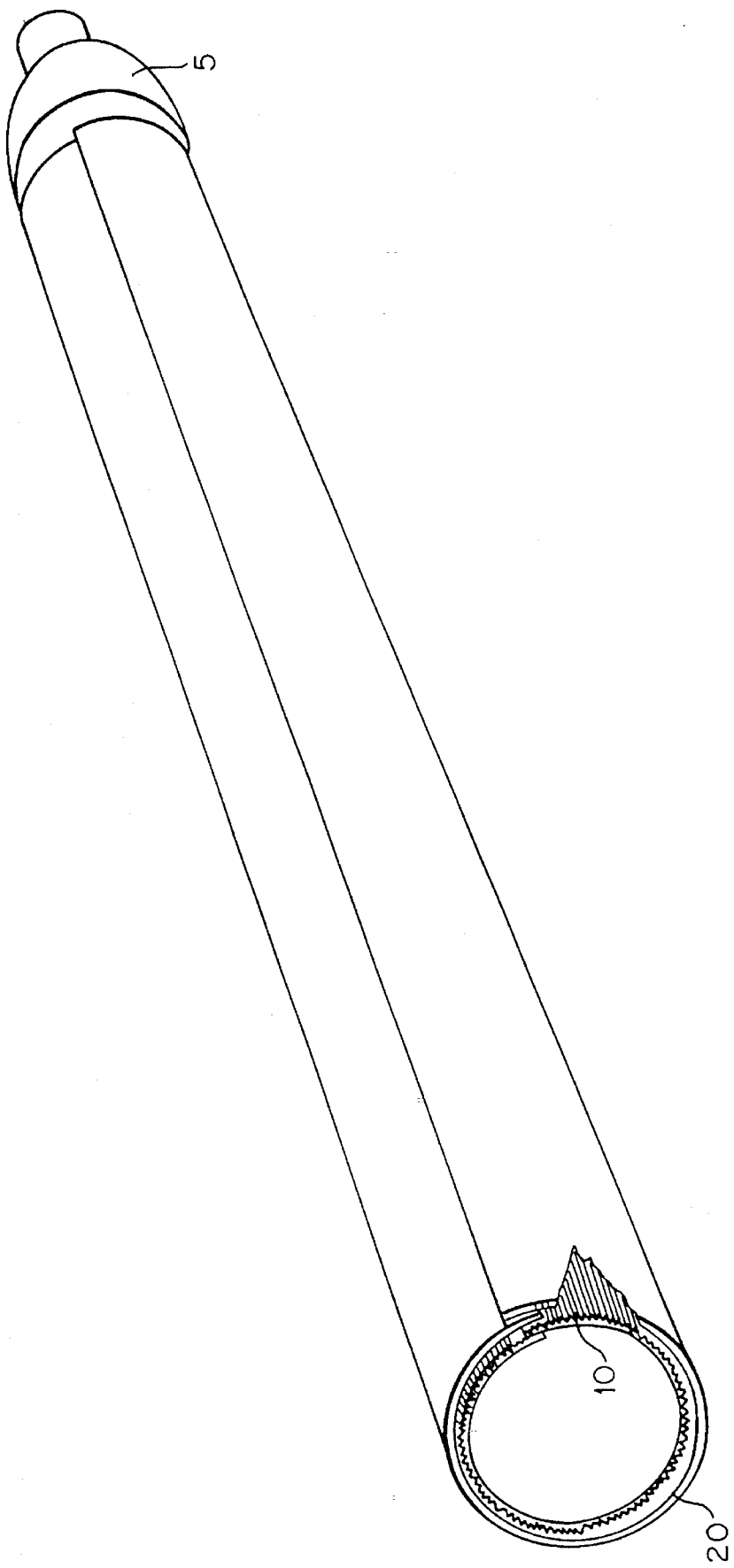
FIG. 1 is a perspective view of a light tube and bulb of one embodiment of the present invention.

FIG. 1 generally illustrates one embodiment of the present invention comprising a light bulb 5 operatively connected with a light tube formed with a sheet of optical light film 10 configured into a substantially cylindrical shape and surrounded by an outer, protective sheet 20. The outer protective sheet may comprise a transparent, flexible polymeric material. Those skilled in the art will appreciate that the protective sheet is not necessarily transparent and can have other finishes including matte, colored or opaque. It will also be appreciated that the thicknesses of the optical light film and the protective sheets can be varied in accordance with the design parameters, including tube diameter.

Figure 2:
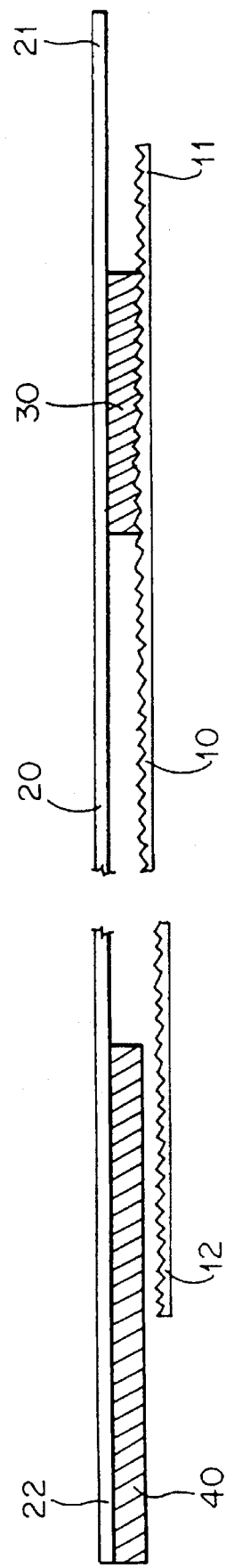
FIGS. 2 and 3 are cross-sectional views of one embodiment of a light tube of the present invention.
Figure 3:
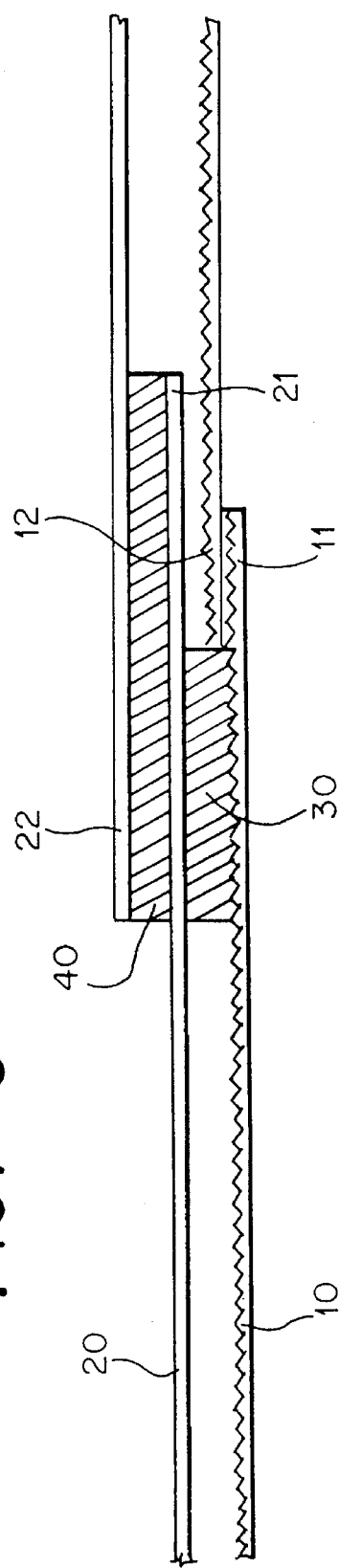

The manner of forming one light tube of the present invention is best illustrated with reference to FIGS. 2 and 3 wherein an optical light film 10 is protected by an outer protective sheet 20 with a use of first connector 30 and a second connector 40. In the manner illustrated in FIG. 2, the first connector 30 is most preferably disposed slightly remote from longitudinal edge portion 11 and is also preferably connected to the outer protective sheet 20 at a contact region slightly remote from a first longitudinal edge 21. In this manner, a slot is defined by the outer surface of edge region 11 of optical light film 10, the connector 30 and the inner side of edge region 21 of protective sheet 20. Therefore, when optical light film 10 is configured into a tube and the second longitudinal edge region 12 is brought around proximate longitudinal edge 11, the second longitudinal edge region 12 can be readily inserted into the slot. In order to maintain the opposing edges of the outer protective sheet 20 in position, a second connector 40 is preferably positioned between the outer surface of protective sheet 20 proximate first longitudinal edge 21 and the inner surface of protective sheet 20 proximate the second longitudinal edge 22. As shown in FIG. 2, the second connector 40 can readily be positioned prior to configuring the sheets into a tube. Since some adhesive tapes which may be used as connectors with the various embodiments of the present invention are provided with liners which protect the adhesive surface before use, one side of such tapes can be adhered to an optical light film or a protective sheet while leaving the other side of the adhesive tape covered by the protective liner. That liner could then be subsequently removed at a different location prior to final assembly. While one preferred embodiment of this invention aligns the second connector 40 with the opposing edges of protective sheet 20, such alignment is not necessary in order to obtain the benefits of the present invention.

The connectors used to join the sheets of the present invention preferably comprise strips of tape, most preferably a two-sided adhesive tape or a tape exhibiting adhesive properties throughout such that both sides and the edges of the tape are sufficiently sticky. One such tape is a Very High Bond Tape available from the 3M Corporation of St. Paul, Minn. which exhibits adhesiveness throughout. Particularly a clear Very High Bond Tape designated "4910" is particularly useful for bonding the smooth surfaces of the outer protective sheet 20, while a white Very High Bond Tape having the designation "4952" is particularly useful for connecting the outer, ridged surface of the optical light film to another surface. It has been found that the clear tape has a tendency to withdraw from the grooves on the outer surfaces of an optical light film resulting in a reduction in adhesion. Those skilled in the art will also appreciate that the thickness and/or width of the adhesive tape utilized can be varied for different applications depending upon such factors as the strength required and any thickness characteristics inherent in the particular tube design.

The optical light tubes of the present invention have many practical uses such as those disclosed in co-pending U.S. patent application Ser. No. 08/055,188 entitled ILLUMINATION DEVICES AND METHODS OF FORMING SAME which is hereby incorporated by reference.

The various embodiments of the present invention can readily be partially or totally assembled at or close to the site of their ultimate use. Assembly at such locations greatly reduces the cost of shipping since the sheets can be shipped in a flat configuration requiring much less volume than assembled tubes. These and other advantages of the present invention will be apparent to those skilled in the art.

Figure 4:
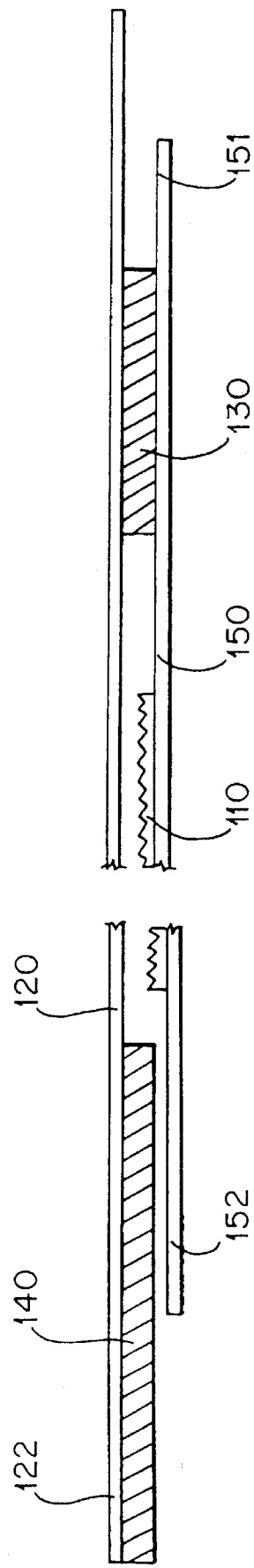
FIGS. 4 and 5 are cross-sectional views illustrating another embodiment an optical light tube of the present invention.
Figure 5:
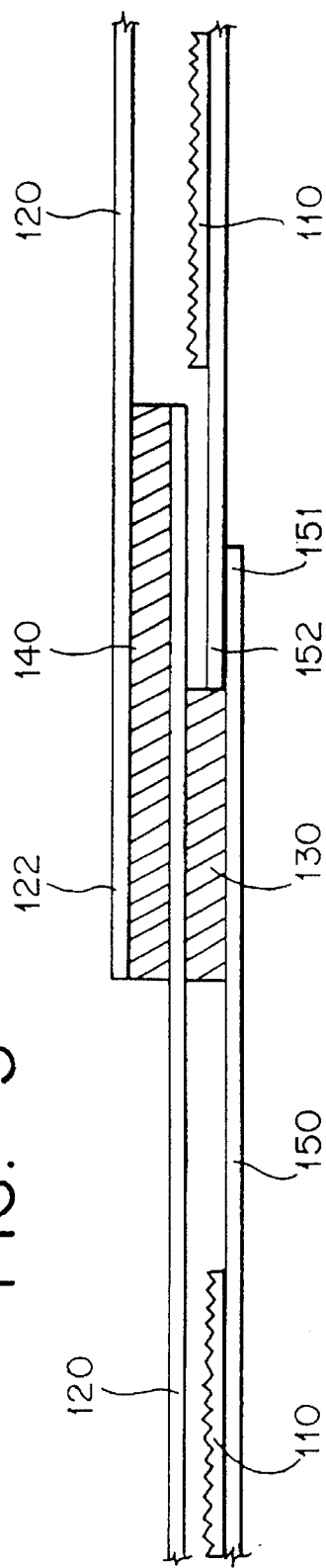

An alternative embodiment of the present invention is illustrated in FIGS. 4 and 5. In this embodiment, at least one optical light film 110 is substantially sandwiched between an outer protective sheet 120 and a separate inner protective sheet 150. Those skilled in the art will appreciate that inner protective sheet 150 is most preferably clear. The two protective sheets are configured and connected in the same fashion as the optical light film and outer protective sheet illustrated in FIGS. 2 and 3. A first connector 130 is utilized to connect an outer surface remote from a first edge of region 151 of inner sheet 150 with an inner surface of outer sheet 120 in a manner that forms a slot which receives a second edge portion 152 of inner sheet 150. The second edge 122 of outer sheet 120 is then configured substantially around the inner protective sheet 150 using a second connector 140 while at least one sheet of optical light film 110 is substantially sandwiched between outer sheet 120 and inner sheet 150. Since the protective sheets are not being connected to an optical light film, it is desirable to use a clear Very High Bond Tape such as the "4910" tape referenced above.

This embodiment of the present invention offers several significant advantages. Primarily, a plurality of optical light films can be readily positioned at discrete locations in the tube leaving sections of the tube without optical light film. Those skilled in the art will appreciate that controlled amounts of light and various patterns can be provided by leaving gaps between discrete sheets of optical light film or by providing light films having extractors or holes which permit the "escape" of light from the light tube.

I claim:

1. A light tube comprising:

a sheet of optical light film comprising a first longitudinal edge portion and a second longitudinal edge portion, said first sheet having sufficient flexibility to allow said first longitudinal edge portion to be disposed in a position proximate said second longitudinal edge portion;

a second sheet comprising a first longitudinal edge, a second longitudinal edge, and a first contact region remote from said first longitudinal edge;

means for maintaining said optical light film in a tube configuration comprising a first connector having at least one adhesive portion, said first connector connected to said optional light film at a position remote from said first longitudinal edge portion and to said second sheet at a position remote from said first longitudinal edge thereby defining a slot; and a second connector comprising at least one adhesive portion, wherein said second connector is connected to at least two separate sections of said second sheet.

2. A light tube according to claim 1, wherein at least one portion of said second longitudinal edge portion of said optical light film is disposed in said slot between said first longitudinal edge portion of said optical light film and said first longitudinal edge of said second sheet.

3. A light tube according to claim 1 wherein said adhesive portions comprise adhesive tape.

4. A light tube according to claim 1 wherein at least one of said connectors comprises a tape having two sides and adhesive properties on both of said sides.

5. A light tube according to claim 1 wherein at least a portion of one edge of said second sheet is disposed in contact with said second connector.

6. A light tube according to claim 5 wherein at least a portion of both of said longitudinal edges of said second sheet are disposed in contact with said second connector.

7. A light tube according to claim 1 wherein at least a portion of said first longitudinal edge portion is disposed in contact with said first connector.

8. A light tube comprising:

a first sheet comprising a first longitudinal edge portion and a second longitudinal edge portion, said first sheet having sufficient flexibility to allow said first longitudinal edge portion to be disposed in a position proximate said second longitudinal edge portion;

a second sheet comprising a first longitudinal edge, a second longitudinal edge, and a first contact region remote from first longitudinal edge;

means for maintaining said first sheet in a tube configuration comprising a first connector having at least one adhesive portion, said first connector connected to said first sheet at a position remote from said first longitudinal edge portion and to said second sheet at a position remote from said first longitudinal edge;

a second connector comprising at least one adhesive portion, wherein said second connector is connected to at least two separate sections of said second sheet; and at least one optical light film disposed between said first sheet and said second sheet.

9. A light tube according to claim 8 comprising at least two separate optical light films disposed between said first sheet and said second sheet.

10. A light tube according to claim 8 wherein at least one portion of said second longitudinal edge portion of said first sheet is disposed between said first longitudinal edge portion of said first sheet and said first longitudinal edge of said second sheet.

11. A light tube according to claim 8 wherein said adhesive portions comprise adhesive tape.

12. A light tube according to claim 8 wherein at least one of said connectors comprises a tape having two sides and adhesive properties on both of said sides.

13. A light tube according to claim 8 wherein at least a portion of one edge of said second sheet is disposed in contact with said second connector.

14. A light tube according to claim 13 wherein at least a portion of both of said longitudinal edges of said second sheet are disposed in contact with said second connector.

15. A light tube according to claim 8 wherein at least a portion of both of said longitudinal edge portions is disposed in contact with said first connector.

16. A light tube comprising:

a sheet of optical light film comprising a first longitudinal edge portion and a second longitudinal edge portion, said first sheet having sufficient flexibility to allow said first longitudinal edge portion to be disposed in a position proximate said second longitudinal edge portion;

a second sheet comprising a first longitudinal edge, a second longitudinal edge, and a first contact region remote from said first longitudinal edge; and means for maintaining said optical light film in a tube configuration comprising a first connector having at least one adhesive portion, said first connector connected to said optical light film at a position remote from said first longitudinal edge portion and to said second sheet at a position remote from said first longitudinal edge thereby defining a slot.

* * * * *